United States Patent
Yang et al.

(10) Patent No.: US 7,805,620 B2
(45) Date of Patent: Sep. 28, 2010

(54) HIGHLY ENERGY-EFFICIENT PROCESSOR EMPLOYING DYNAMIC VOLTAGE SCALING

(75) Inventors: Yil Suk Yang, Daejeon (KR); Jong Dae Kim, Daejeon (KR); Soon Il Yeo, Daejeon (KR); Chun Gi Lyuh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 942 days.

(21) Appl. No.: 11/520,177

(22) Filed: Sep. 13, 2006

(65) Prior Publication Data

US 2007/0150763 A1 Jun. 28, 2007

(30) Foreign Application Priority Data

Dec. 8, 2005 (KR) ........................ 10-2005-0119649
May 16, 2006 (KR) ........................ 10-2006-0043744

(51) Int. Cl.
*G06F 1/00* (2006.01)
(52) U.S. Cl. ..................................... 713/300
(58) Field of Classification Search ................. 713/300
See application file for complete search history.

(56) References Cited

U.S. PATENT DOCUMENTS

| | | | |
|---|---|---|---|
| 5,666,537 A * | 9/1997 | Debnath et al. | 713/322 |
| 6,219,796 B1 * | 4/2001 | Bartley | 713/320 |
| 6,307,281 B1 | 10/2001 | Houston | |
| 6,625,740 B1 | 9/2003 | Datar et al. | |
| 6,941,480 B1 | 9/2005 | Dai | |
| 7,107,471 B2 * | 9/2006 | Feierbach | 713/324 |
| 7,417,482 B2 * | 8/2008 | Elgebaly et al. | 327/278 |
| 7,441,136 B2 * | 10/2008 | Feekes, Jr. | 713/324 |
| 2005/0024927 A1 * | 2/2005 | Dolwin | 365/154 |

FOREIGN PATENT DOCUMENTS

| | | |
|---|---|---|
| JP | 11-149459 | 6/1999 |
| JP | 2004-96073 | 3/2004 |
| KR | 10-2005-0082761 | 8/2005 |

\* cited by examiner

*Primary Examiner*—Thomas Lee
*Assistant Examiner*—Brandon Kinsey
(74) *Attorney, Agent, or Firm*—Ladas & Parry LLP

(57) ABSTRACT

Provided is a highly energy-efficient processor architecture. The architecture employs 2-stage dynamic voltage scaling (DVS) and a sleep mode for high energy efficiency, dynamically controls the power supply voltage and activation of an embedded processor with instructions, and thus can prevent performance deterioration while reducing power consumption.

A highly energy-efficient processor employing the processor architecture includes: a function unit block for performing an operation according to instructions input from the outside; at least one peripheral unit block for performing data communication with an external device; an instruction decoder for interpreting the input instructions and determining operation modes of the function unit block and peripheral unit block required for executing the interpreted instructions; a function unit block driver for applying a different power supply voltage according to the operation mode of the function unit block to the function unit block; and a peripheral unit block driver for applying a different power supply voltage according to the operation mode of the peripheral unit block to the peripheral unit block.

10 Claims, 7 Drawing Sheets

HIGHLY ENERGY-EFFICIENT PROCESSOR EMPLOYING DYNAMIC VOLTAGE SCALING

CROSS-REFERENCE TO RELATED APPLICATION

This application claims priority to and the benefit of Korean Patent Application Nos. 2005-119649, filed Dec. 8, 2005, and 2006-43744, filed May 16, 2006, the disclosures of which are incorporated herein by reference in their entirety.

BACKGROUND

1. Field of the Invention

The present invention relates to a highly energy-efficient processor executing logic operations, and more particularly, to a processor having a structure that employs 2-stage dynamic voltage scaling (DVS) and a sleep mode, and ensures high energy efficiency. In addition, the present invention can be efficiently used in embedded processor architecture.

2. Discussion of Related Art

Processors can be classified into a single chip processor such as a central processing unit (CPU) used in a personal computer (PC), and an embedded processor used for a configuration block in a system on chip (SoC) such as various chips for control and smart cards. Embedded processors (micro processor unit (MPU)/micro controller unit (MCU)/digital signal processor (DSP)) are widely used for arithmetic and signal processing. In general, an embedded processor is a core block in a SoC that transforms and processes a signal by fetching, decoding and executing instructions, and executes operations of reading and writing the processed signal. As the degree of integration of highly functionalized embedded processors increases, so do power consumption and heat radiation.

In this patent specification, energy efficiency is defined as "performance/total power". More specifically, with respect to an embedded processor, energy efficiency equals information processing/transformation capability divided by power consumption, and its units are million instructions per second (MIPS)/mW or millions of operations per second (MOPS)/mW. MIPS are general units for expressing performance and indicate how many millions of instructions can be processed per second. When the performance of an embedded processor is improved and the power consumption decreases, high energy efficiency can be achieved.

In general, power consumption is proportional to the square of an applied power supply voltage. Decrease of the power supply voltage is the most effective method for reducing power consumption, but a low power supply voltage increases a delay time, thereby decreasing the performance of a processor. Thus, a parallel-pipeline structure is widely used to improve the performance of an embedded processor. A typical parallel-pipeline structure is a single instruction multiple data (SIMD) structure transforming and processing several data in response to one instruction.

A DVS technique has the characteristic of dynamically reducing a power supply voltage, and can minimize performance deterioration caused while the power supply voltage is reduced by properly adjusting a transition from a reduced supply voltage Vdd1 to a normal supply voltage Vdd and vice versa.

FIG. 1 is a block diagram of a conventional SIMD structure of an embedded processor using a single power supply voltage. In the processor, performance is improved, but power consumption increases due to increase of hardware. Consequently, energy efficiency decreases.

FIG. 2 is a block diagram of a conventional embedded processor using multiple power supply voltages. In the processor, it is possible to reduce power consumption by properly using the multiple power supply voltages. However, a level shifter block adjusting a supply voltage level upon interfacing between blocks should be added because of the different power supply voltages. In some cases, the energy efficiency, i.e., "performance/total power", may be lower than in a single supply voltage processor because of performance decrease caused by low driving voltage and level adjustment.

SUMMARY OF THE INVENTION

The present invention is directed to a processor capable of maximizing energy efficiency, defined as "performance/total power".

The present invention is also directed to a processor capable of maximizing energy efficiency with a relatively simple structure.

One aspect of the present invention provides a highly energy-efficient processor comprising: a function unit block for performing an operation according to instructions input from the outside; at least one peripheral unit block for performing data communication with an external device; an instruction interpreter for interpreting the input instructions and determining operation modes of the function unit block and the peripheral unit block required for executing the interpreted instructions; a function unit block driver for applying a different power supply voltage according to the operation mode of the function unit block to the function unit block; and a peripheral unit block driver for applying a different power supply voltage according to the operation mode of the peripheral unit block to the peripheral unit block.

Another aspect of the present invention provides a processor that can be used as a unit processor of a parallel processor, comprising: a processing element including an instruction interpreter for receiving and interpreting instructions input from outside; and an element driver for supplying the processing element with a power supply voltage, wherein the level of the power supply voltage output from the element driver is determined according to the interpretation result of the instruction interpreter with respect to the received instructions.

Still another aspect of the present invention provides a parallel processor comprising: at least two unit processors including processing elements performing an operation or data transfer according to instructions input from the outside, and element drivers for supplying the processing elements with supply voltage; and a processing element selector interpreting the instructions and determining a unit processor required for processing the instructions, wherein the element drivers each supplies a different supply voltage according to the determination of the processing element selector.

BRIEF DESCRIPTION OF THE DRAWINGS

The above and other features and advantages of the present invention will become more apparent to those of ordinary skill in the art by describing in detail preferred exemplary embodiments thereof with reference to the attached drawings in which.

DETAILED DESCRIPTION OF EXEMPLARY EMBODIMENTS

Hereinafter, exemplary embodiments of the present invention will be described in detail. However, the present invention is not limited to the exemplary embodiments disclosed below and can be implemented in various forms. Therefore, the present exemplary embodiments are provided for complete disclosure of the present invention and to fully inform the scope of the present invention to those of ordinary skill in the art.

The below description concerns an embedded processor whose need of high energy efficiency is relatively great. However, since there is no technical difficulty involved in embodying a highly energy-efficient structure used in an embedded processor in a one-chip processor, a one-chip processor in which the same highly energy-efficient structure is embodied falls within the scope of the present invention.

Meanwhile, in the description below, the words "enable" and "disable" are used to indicate a state of each circuit block. The word "disable" means that a circuit block switches to a sleep mode other than an operation mode.

First Exemplary Embodiment

Figure 1:
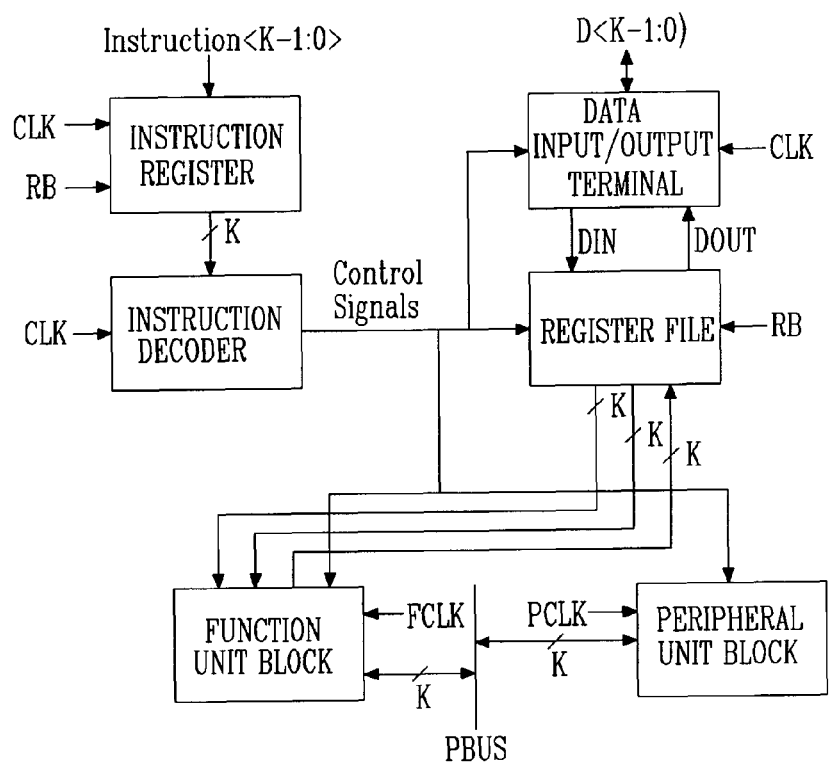
FIG. 1 is a block diagram of a conventional single instruction multiple data (SIMD) structure of an embedded processor using a single power supply voltage.
Figure 2:
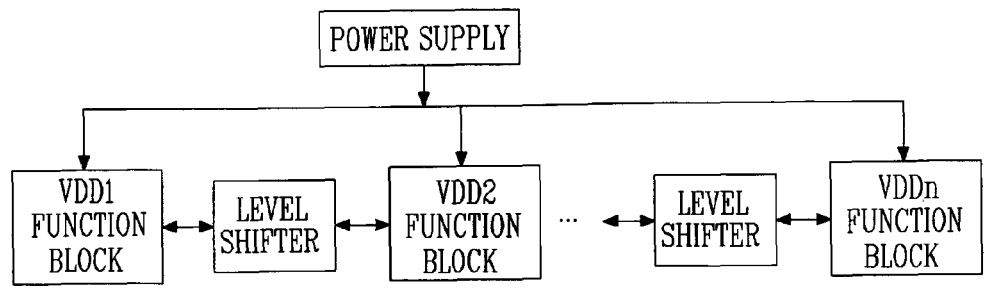
FIG. 2 is a block diagram of a conventional embedded processor using multiple power supply voltages.
Figure 3:
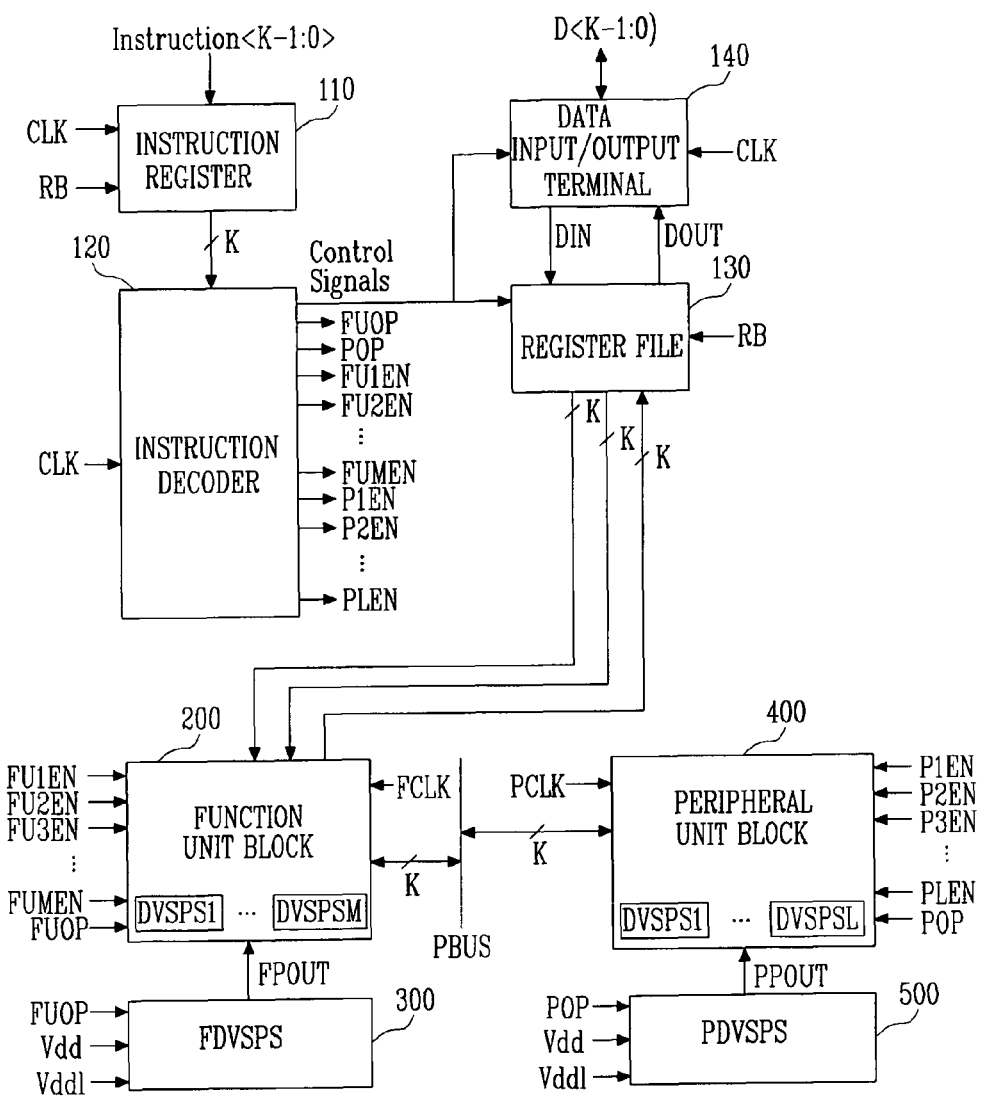
FIG. 3 is a block diagram of a highly energy-efficient processor employing 2-stage dynamic voltage scaling (DVS) and a sleep mode according to an exemplary embodiment of the present invention.

As illustrated in FIG. 3, a highly energy-efficient embedded processor according to a first exemplary embodiment of the present invention includes a function unit block 200, a peripheral unit block 400, an instruction input terminal 110, an instruction decoder 120, a Function Units Dynamic Voltage Scaling Power Supply (FUDVSPS) 300, and a Peripherals Units Dynamic Voltage Scaling Power Supply (PDVSPS) 500. The function unit block 200 includes at least one function unit for performing logic operations. The peripheral unit block 400 includes at least one peripheral unit for performing data communication with an external device. The instruction input terminal 110 is for receiving instructions input from the outside. The instruction decoder 120 is for interpreting the received instructions and determining operation modes of the function unit block and peripheral unit block required for executing the interpreted instructions. The f Function Units Dynamic Voltage Scaling Power Supply (FUDVSPS) 300 is for supplying the function unit block 200 with a different power supply voltage according to an operation mode of the function unit block 200. The Peripherals Units Dynamic Voltage Scaling Power Supply (PDVSPS) 500 is for supplying the peripheral unit block 400 with a different power supply voltage according to an operation mode of the peripheral unit block 400. In some cases, the highly energy-efficient embedded processor may further comprise a register file 130 for temporarily storing a value required for interpreting or executing instructions, and/or a data input/output terminal 140 for loading or storing data from/in an external memory.

The instruction input terminal 110 may be an instruction register temporarily storing instructions. The instruction input terminal 110 receives a reset signal RB and a clock signal CLK, and receives in parallel the instructions through a K-bit instruction bus. However, in some cases, the instruction input terminal 110 may be configured to serially receive instructions through a serial line.

The instruction decoder 120 receives binary instructions from the instruction register and the clock for synchronization. According to the interpreted instructions, the instruction decoder 120 selectively outputs control signals for the register file 130 and the data input/output terminal 140, an operation signal FUOP for all the function units, an operation signal POP for all the peripheral units, operation signals FU1EN, FU2EN, . . . , FUMBN respectively for M number of function units, and operation signals P1EN, P2EN, . . . , PLEN respectively for L number of peripheral units.

The register file 130 is connected to the data input/output terminal 140 and the function unit block 200 so as to temporarily store data input/output from/to the external memory and data generated during operation of the function units, and receives the reset signal RB and the control signal from the instruction decoder.

According to the control signal output from the instruction decoder 120, in compliance with the clock CLK, the data input/output terminal 140 writes, in the external memory, the data temporarily stored in the register file 130, or reads the data stored in the external memory and writes it in the register file 130. In a particular case, a serial transmission connection can be established between the data input/output terminal 140 and the external memory, but a parallel transmission connection using a bus D<K−1:0> as illustrated in FIG. 3 is preferable for a faster transfer rate.

In order to perform data communication directly with each other, without passing through the register file, the function unit block 200 and the peripheral unit block 400 may be connected through a K-bit local bus PBUS, or may be configured to receive a function clock FCLK and/or a peripheral clock PCLK, both having a different value from the main clock CLK.

Figure 4:
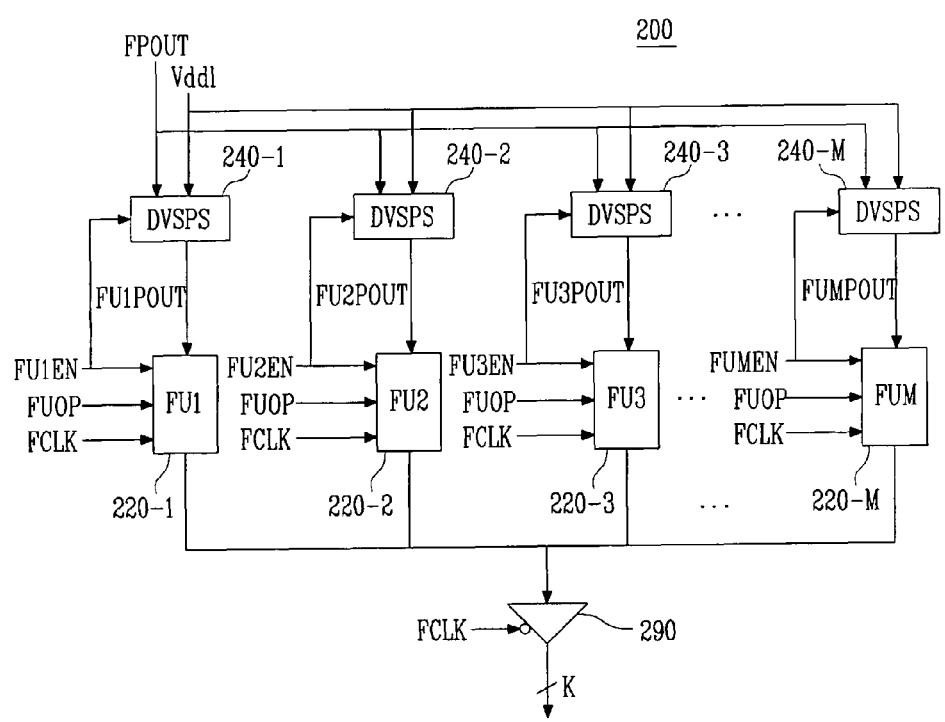
FIG. 4 is a detailed block diagram showing the internal structure of a function unit block shown in FIG. 3.

When the number of function units is two or more, two or more function units 220-1 to 220-M are included in the function unit block 200, as illustrated in FIG. 4. In this case, the Function Units Dynamic Voltage Scaling Power Supply (FUDVSPS) 300 of FIG. 3 is for supplying the entire function unit block with driving voltage. The Function Units Dynamic Voltage Scaling Power Supply (FUDVSPS) is supplied with a normal supply voltage Vdd and a reduced supply voltage Vdd1 from a voltage generator, which is not shown in the drawings, selects one of the normal supply voltage Vdd and the reduced supply voltage Vdd1 according to the operation signal FUOP for all of the function units, and applies the selected voltage as a Power for Function Units FPOUT to the function unit block 200.

Meanwhile, in order to determine the power supply voltage applied to drive each function unit 220-1 to 220-M, the function unit block 200 includes function unit drivers 240-1 to 240-M, respectively provided for the function units 220-1 to 220-M.

Figure 5:
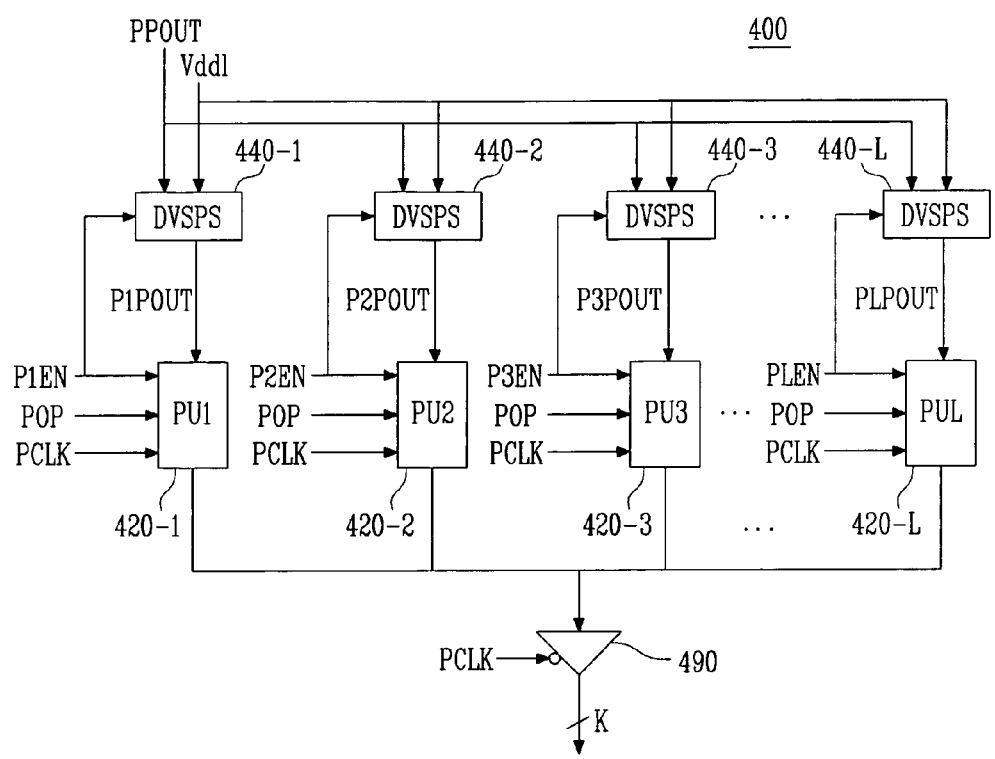
FIG. 5 is a detailed block diagram showing the internal structure of a peripheral unit block shown in FIG. 3.

When the number of peripheral units is two or more, two or more peripheral units 420-1 to 420-L are included in the peripheral unit block 400, as illustrated in FIG. 5. In this case, the Peripherals Units Dynamic Voltage Scaling Power Supply (PDVSPS) 500 of FIG. 3 is for supplying the entire peripheral unit block with driving voltage. The Peripherals Units Dynamic Voltage Scaling Power Supply (PDVSPS) is supplied with the normal supply voltage Vdd and the reduced supply voltage Vdd1 from a voltage generator, which is not shown in the drawings, selects one of the normal supply voltage Vdd and the reduced supply voltage Vdd1 according to the operation signal POP for all of the peripheral units, and applies the selected voltage as a peripheral block application voltage PPOUT to the peripheral unit block 400.

Meanwhile, in order to determine the level of supply voltage applied to drive each peripheral unit 420-1 to 420-L, the peripheral unit block 400 includes peripheral unit drivers 440-1 to 440-L, respectively provided for the peripheral units 420-1 to 420-L.

The Function Units Dynamic Voltage Scaling Power Supply (FUDVSPS) 300 and the Peripherals Units Dynamic Voltage Scaling Power Supply (PDVSPS) 500 may be power supplies shifting an output voltage from the reduced supply voltage Vdd1 to the normal supply voltage Vdd or vice versa by the input signals FUOP and POP, and perform a dynamic voltage scaling (DVS) function. For example, when the signal FUOP (or POP) is "low", the output voltage FPOUT of the Function Units Dynamic Voltage Scaling Power Supply FDVSPS (or the Peripherals Units Dynamic Voltage Scaling Power Supply PDVSPS) becomes the reduced power supply voltage Vdd1. On the contrary, when the signal FUOP (or POP) is "high", the output voltage FPOUT becomes the normal supply voltage Vdd.

Operations of the processor illustrated in FIG. 3 according to the first exemplary embodiment will be descried below on the basis of each control signal.

The reset signal RB is an input signal for initializing the embedded processor, and the clock signal CLK is the main clock signal. Therefore, all instructions are synchronized with the clock signal CLK. The function clock FCLK is a signal for synchronization with the logic operation of the function unit block 200, and may be faster than the main clock CLK for fast operation speed. The peripheral clock PCLK is a signal for synchronization with the operation of the peripheral unit block 400, and may be faster or slower than the main clock CLK for synchronization with the speed of the external device connected with the peripheral unit block 400.

As illustrated in FIG. 3, the Function Units Dynamic Voltage Scaling Power Supply (FUDVSPS) 300 may be a function unit dynamic voltage scaling power supply (FDVSPS) controlling the entire supply voltage of the M function units, and the Peripherals Units Dynamic Voltage Scaling Power Supply (PDVSPS) 500 may be a peripheral units dynamic voltage scaling power supply (PDVSPS) controlling the entire supply voltage of the L peripheral units.

According to the result of instruction interpretation, the signals FUOP and POP are applied as inputs to the FDVSPS and PDVSPS and control the power supply voltages of the entire function unit block 200 and the entire peripheral unit block 400. Hereupon, all operations of the M function units and/or the L peripheral units are enabled or disabled.

The operation signals FU1EN, FU2EN, . . . , FUMEN are enable signals respectively for the M function units, and the operation signals P1EN, P2EN, . . . , PLEN are enable signals respectively for the L peripheral units.

With respect to the function unit block 200 or the peripheral unit block 400, the normal supply voltage Vdd is a supply voltage required for performing normal operation, i.e., a normal mode, and the reduced supply voltage Vdd1 is a minimum voltage supplied to swiftly shift to the normal mode when the unit block 200 or 400 does not operate but rather stands by, i.e., is in a sleep mode. Therefore, in general, the normal supply voltage Vdd has a higher level than t the reduced supply voltage Vdd1.

When K-bit instructions are input, the instruction decoder 120 interprets the K-bit instructions and generates various control signals. Among the generated control signals, a register file control signal is transmitted to the register file 130 capable of storing P number of K-bit values, and used for selecting and controlling registers corresponding to the input instructions. And, a data input/output terminal control signal is input to the data input/output terminal 140 and used for controlling data input from the external memory and data output to the external memory.

Among the control signals generated from the instruction decoder 120, the signal FUOP controls the Function Units Dynamic Voltage Scaling Power Supply (FUDVSPS) 300 controlling the entire power supply voltage of the M function units included in the function unit block 200, and may be applied to each function unit in some cases. In addition, among the control signals generated from the instruction decoder 120, the signal POP controls the Peripherals Units Dynamic Voltage Scaling Power Supply (PDVSPS) 500 controlling the entire supply voltage of the L peripheral units included in the peripheral unit block 400, and may be applied to each peripheral unit in some cases. Some instructions may selectively use one of the entire function unit block 200 and the entire peripheral unit block 400, and the two control signals FUOP and POP may selectively enable only the function unit(s) and/or peripheral unit(s) required for executing the instructions.

Here, the function units and/or peripheral units selected to be enabled are shifted from the reduced supply voltage Vdd1 to the normal supply voltage Vdd by the function unit block driver FDVSPS or the Peripherals Units Dynamic Voltage Scaling Power Supply (PDVSPS) 500. On the contrary, the non-selected function units and/or peripheral units are shifted from the normal supply voltage Vdd to the reduced supply voltage Vdd1, so that it is possible to maintain performance and reduce power consumption. For example, when the control signal FUOP alone is generated, the power supply voltage of the M function units shifts from the reduced supply voltage Vdd1 to the normal supply voltage Vdd, but the power supply voltage of the L peripheral units is maintained at the reduced supply voltage Vdd1.

FIG. 4 is a block diagram showing a detailed structure of the function unit block according to the first exemplary embodiment. As illustrated in FIG. 4, the embedded processor of the first exemplary embodiment includes the M function units (FUs).

The illustrated function unit block 200 includes the M function units 220-1 to 220-M, and the M function unit drivers 240-1 to 240-M respectively supplying the M function units with power supply voltages. The function unit drivers 240-1 to 240-M each may be a dynamic voltage scaling power supply (DVSPS). In addition, as illustrated in FIG. 4, the function unit drivers 240-1 to 240-M may be configured to receive the function unit block operation enable signal FUOP generated from the instruction interpreter, the enable signals FU1EN, FU2EN, . . . , FUMEN respectively for the M function units, the clock FCLK of the function units, the reduced supply voltage Vdd1, and the voltage FPOUT generated by the function unit block driver. The function unit block 200 may further include a data input/output interface including an output interface 290 illustrated in FIG. 4, which is common knowledge in the art and thus a description thereof will be omitted.

Only one function unit required for executing instructions is selected from the M function units 220-1 to 220-M. The power supply voltage of the selected function unit is shifted from the reduced supply voltage Vdd1 to the normal supply voltage Vdd by the M function unit drivers 240-1 to 240-M respectively receiving the M function unit enable signals FU1EN, FU2EN, ., FUMEN. The processor may be configured so that a function unit is selected by only adjusting the power supply voltage of each function unit, or by applying the M function unit enable signals FU1EN, FU2EN, . . . , FUMEN respectively to the M function units 220-1 to 220-M, as illustrated in FIG. 4. Since the level of a power supply voltage required for each function unit is controlled as described above using the function unit drivers 240-1 to 240-M, only the required function unit is allowed to operate at the normal supply voltage and the other function units are not allowed to operate at the normal supply voltage. Therefore, it is possible to reduce power consumption without decreasing processor performance, and thus the processor shows high energy efficiency and high processor performance.

FIG. 5 is a block diagram showing a detailed structure of the peripheral unit block of the exemplary embodiment. As illustrated in FIG. 5, the embedded processor of the exemplary embodiment includes the L peripheral units (PUs).

The illustrated peripheral unit block 400 includes the L peripheral units 420-1 to 420-L, and the L peripheral unit drivers 440-1 to 440-L respectively supplying the L peripheral units with power supply voltages. The peripheral unit drivers 440-1 to 440-L each may be a dynamic voltage scaling power supply (DVSPS). In addition, as illustrated in FIG. 5, the peripheral unit drivers 440-1 to 440-L may be configured to receive the peripheral unit block operation enable signal POP generated from the instruction interpreter, the enable signals P1EN, P2EN, . . . , PLEN respectively for the L peripheral units, the clock PCLK of the peripheral units, the reduced supply voltage Vdd1, and the voltage PPOUT generated by the peripheral unit block driver. The peripheral unit block 400 may further include a data input/output interface including an output interface 490 illustrated in FIG. 5, which is common knowledge in the art and thus a description thereof will be omitted.

Only one peripheral unit required for executing the instruction is selected from the L peripheral units 420-1 to 420-L. The power supply voltage of the selected peripheral unit is shifted from the reduced supply voltage Vdd1 to the normal supply voltage Vdd by the L peripheral unit drivers 440-1 to 440-L respectively receiving the L number of peripheral unit enable signals P1EN, P2EN, . . . , PLEN. The processor may be configured so that a peripheral unit is selected by only adjusting the power supply voltage of each peripheral unit, or by applying the L number of peripheral unit enable signals P1EN, P2EN, . . . , PLEN respectively to the L peripheral units 420-1 to 420-L, as illustrated in FIG. 5. Since the level of a power supply voltage required for each peripheral unit is controlled as described above using the peripheral unit drivers 440-1 to 440-L, only the required peripheral unit is allowed to operate at the normal supply voltage and the other peripheral units are not allowed to operate at the normal supply voltage. Therefore, it is possible to reduce power consumption without decreasing processor performance, and thus the processor shows high energy efficiency and high processor performance.

In FIGS. 4 and 5, all the sleep supply voltages supplied to the function units and peripheral units are indicated as the same level. However, when required, the levels of the sleep supply voltage applied to the function unit block 200 and to the peripheral unit block 400 may be different from each other. Or, the levels of the sleep supply voltage applied to each function unit/peripheral unit may be different.

When the function unit block enable signal FUOP becomes "high" and the peripheral unit block enable signal POP becomes "low" as a result of the instructions, the peripheral unit block 400 shifts to the sleep mode in which the power supply voltage of the L peripheral units 420-1 to 420-L in the embedded processor is maintained at the sleep supply voltage by the Peripherals Units Dynamic Voltage Scaling Power Supply (PDVSPS) 500, the clock PCLK for the peripheral units becomes 0 level, and all the input states of the L peripheral units become 0 level, thus reducing power consumption to a minimum.

Meanwhile, by the Function Units Dynamic Voltage Scaling Power Supply (FUDVSPS) 300 and a function unit driver (one of 240-1 to 240-M) taking charge of the selected function unit, the power supply voltage of function units whose enable signals are "high" among the enable signals FU1EN, FU2EN, . . . , FUMEN of the M function units 220-1 to 220-M is shifted from the reduced supply voltage Vdd1 to the normal supply voltage Vdd, the power supply voltage of the non-selected function units is maintained at the reduced supply voltage Vdd1, and thereby operational power consumption is minimized.

When the peripheral unit block enable signal POP becomes "high" and the function unit block enable signal FUOP becomes "low" as a result of the instructions, the function unit block 200 shifts to the sleep mode in which the power supply voltage of the M function units 220-1 to 220-M in the embedded processor is maintained at the sleep supply voltage by the f Function Units Dynamic Voltage Scaling Power Supply (FUDVSPS) 300, the clock PCLK for the function units becomes 0 level, and all the input states of the M function units become 0 level, thus reducing power consumption to a minimum.

Meanwhile, by the Peripherals Units Dynamic Voltage Scaling Power Supply (PDVSPS) 500 and a peripheral unit driver (one of 440-1 to 440-L) taking charge of the selected peripheral unit, the power supply voltage of peripheral units whose enable signals are "high" among the enable signals P1EN, P2EN, . . . , PLEN of the L peripheral units 420-1 to 420-L is shifted from the reduced supply voltage Vdd1 to the normal supply voltage Vdd, the power supply voltage of the non-selected peripheral units is maintained at the reduced supply voltage Vdd1, and thereby power consumption is minimized. The L peripheral units 420-1 to 420-L may be connected to the embedded processor, i.e., required function units, through the peripheral bus PBUS.

Second Exemplary Embodiment

Figure 6:
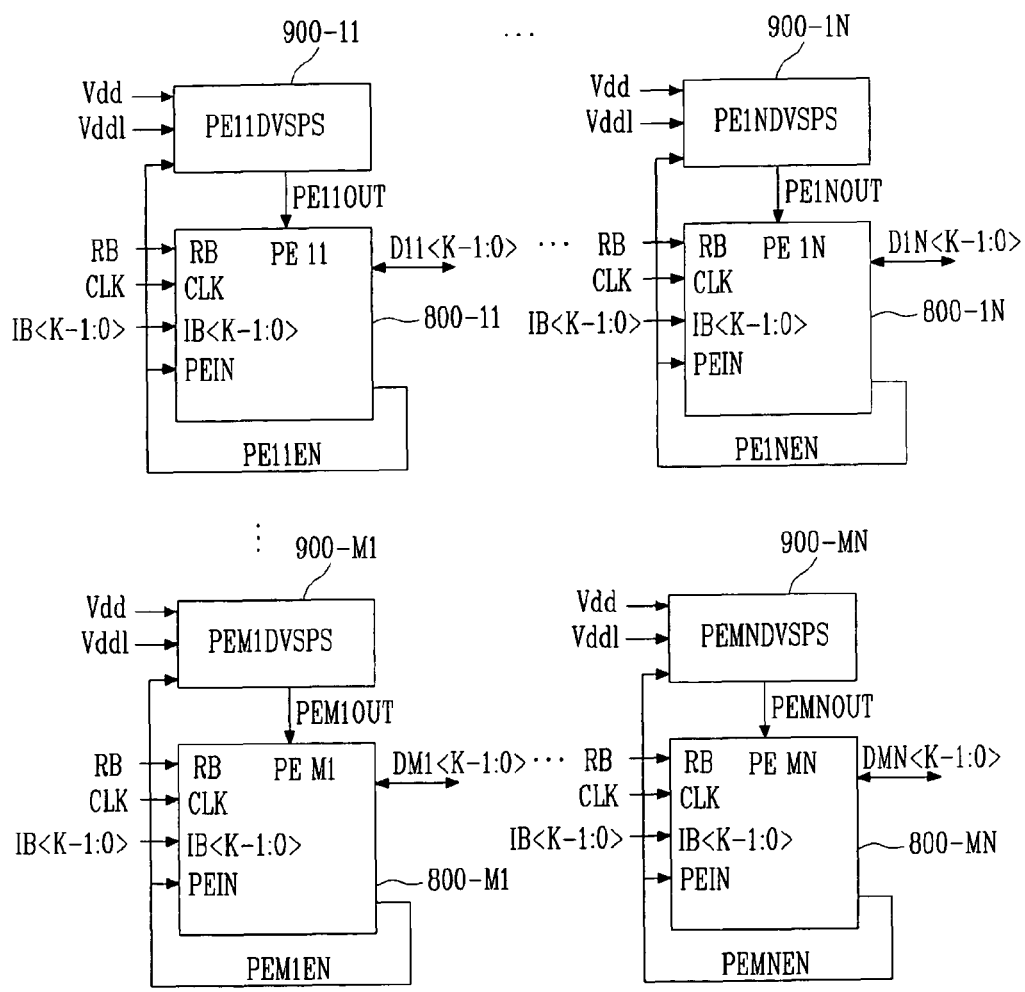
FIG. 6 is a block diagram showing a parallel processing structure of N×M number of unit processors employing the 2-stage DVS and sleep mode according to an exemplary embodiment of the present invention.

FIG. 6 is a block diagram showing an N×M parallel processor for K-bit parallel processing employing 2-stage DVS and a sleep mode according to the present invention. The processor includes a reset signal RB, a clock CLK, a K-bit instruction bus IB<K−1:0>, a K-bit data bus D<K−1:0>, N×M number of processing elements (PEs) 800-11, . . . , 800-1N, . . . , 800-M1, . . . , 800-MN, and N×M number of processing element drivers 900-11, . . . , 900-1N, . . . , 900-M1, . . . , 900-MN respectively controlling the power supply voltages of the processing elements. The processing element drivers 900-11, . . . , 900-1N, . . . , 900-M1, . . . , 900-MN are DVSPSs.

Figure 7:
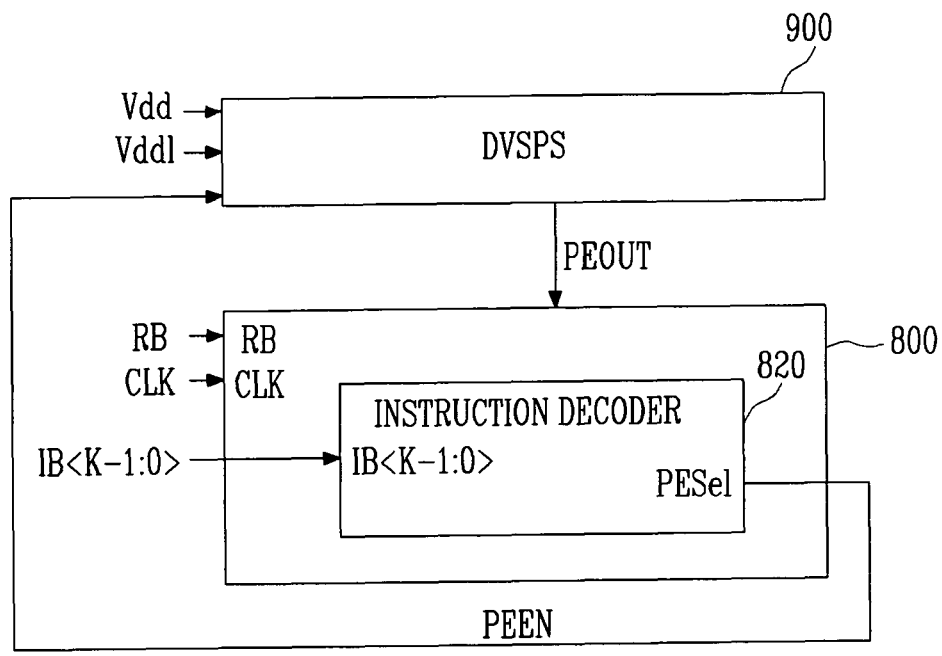
FIG. 7 is a block diagram showing a structure of each unit processor for parallel processing configuring the parallel processing structure shown in FIG. 6.

Here, as illustrated in FIG. 7, each unit processor includes a processing element 800 including an instruction decoder 820 for receiving and decoding instructions input from outside, and an element driver 900 for supplying the processing element 800 with power supply voltage. According to the interpretation result of the instruction decoder with respect to the input instructions, the level of a power supply voltage PEOUT output from the element driver 900 is determined.

The instruction decoder 820 functions similarly to the instruction decoder of the first exemplary embodiment. The instruction decoder 820 decoders the instructions input from the outside, determines whether or not the instruction decoder itself is used for executing the instructions, and when it is determined that the instruction decoder itself is used, enables and transmits a signal PESe1 to the element driver 900. When the signal PESe1 is enabled, the element driver 900 supplies a normal supply voltage Vdd as a supply voltage for the processing element 800. On the contrary, when the signal PESe1 is disabled, the element driver supplies a reduced supply voltage Vdd1 as the power supply voltage for the processing element 800, thereby shifting the processing element 800 to the sleep mode. However, even in the sleep mode, the instruction decoder 820 should normally operate. Thus, it is preferable to incorporate the instruction decoder in a circuit that can be driven by the reduced supply voltage Vdd1, or to configure the instruction decoder so that the normal supply voltage Vdd is supplied to the instruction decoder even in the sleep mode. This is the same for a component such as an instruction input terminal configuring a path along which external instructions reach the instruction decoder 820.

In order to determine whether or not a unit processor including the instruction decoder itself is used according to the input instructions, the instruction decoder 820 should obtain information about a position (sequence) of the unit processor in the overall parallel processor structure. To this end, the processor may further include a means for designating a parallel position, which may be a register designating a position or an input pin receiving a fixed voltage signal designating a position.

As can be seen from FIG. 6, all the unit processors included in the parallel processor structure are connected through the same instruction bus and receive the same clock. As illustrated in FIG. 6, the data bus may be embodied so that the unit processors have different addresses or the same address. In this manner, the unit processors of the exemplary embodiment are independent of each other but connected to each other, and there is no configuration controlling all of the unit processors. This is because each unit processor determines by itself whether or not it is used for processing the input instructions. Therefore, as illustrated in FIGS. 6 and 7, the unit processor circuits of the exemplary embodiment may be inner unit processors of the processor for parallel processing, or may be packaged into one processor. In the latter case, it is possible to easily configure a multi-processor structure in which a plurality of processors are connected in parallel and perform parallel processing.

The second exemplary embodiment incorporates the spirit of the present invention in the relationship between a unit processor and another outside the unit processor, and the first exemplary embodiment incorporates the spirit of the present invention in the relationship between function/peripheral units in the processor. Therefore, it is possible to embody a processor having the characteristics of the first exemplary embodiment together with the characteristics of the second exemplary embodiment. In this case, a description of each component can be derived from the first and second exemplary embodiments, and thus will not be repeated.

Third Exemplary Embodiment

The third exemplary embodiment is an N×M parallel processor for K-bit parallel processing employing 2-stage DVS and a sleep mode according to the present invention. The third exemplary embodiment is not like the second exemplary embodiment which is just a simple collection of unit processors, but rather includes an additional processing element selection unit for determining a unit processor that operates according to instructions input from the outside.

Figure 8:
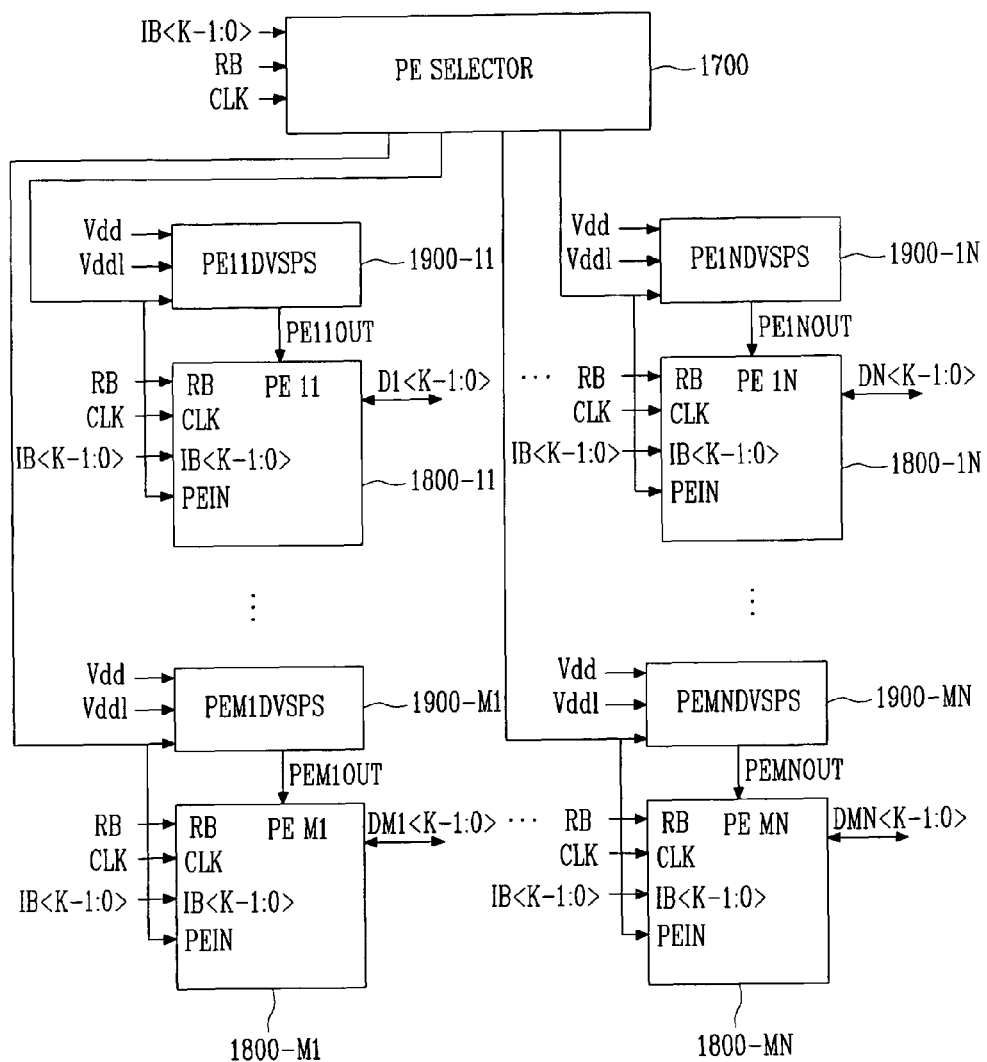
FIG. 8 is a block diagram showing a structure of an N×M parallel processor employing 2-stage DVS and a sleep mode according to another exemplary embodiment of the present invention.

The processor for parallel processing illustrated in FIG. 8 includes two or more unit processors and a processing element selector 1700. The unit processors include processing elements 1800-11, ..., 1800-1N, ., 1800-M1, ..., 1800-MN performing an operation or data transfer according to instructions input from the outside, and element drivers 1900-11, ..., 1900-1N, ..., 1900-M1, ..., 1900-MN for supplying the processing elements 1800-11, ... 1800-1N, ..., 1800-M1, ..., 1800-MN with power supply voltages. The processing element selector 1700 interprets the instructions and determines a unit processor required to process the instructions. The element drivers 1900-11, ..., 1900-1N, ..., 1900-M1, ..., 1900-MN supply power supply voltages, each having a different level according to the determination of the processing element selector 1700.

The processing element selector 1700 functions similarly to the instruction decoder of the first exemplary embodiment. The processing element selector 1700 decoders the instructions input from the outside, determines unit processors required for executing the instructions, enables signals PEIN applied to the determined unit processors only, and disables signals PEIN applied to unused unit processors, thereby causing a reduced supply voltage Vdd1 to be supplied to the processing elements of the unused unit processors.

The element drivers 1900-11, ..., 1900-1N, ..., 1900-M1, ..., 1900-MN of the unit processors, which are important components of the present invention along with the processing element selector 1700, are the same as in the second exemplary embodiment, and thus a description thereof will not be repeated.

In the third exemplary embodiment also, it is possible to embody a processor having the characteristics of the first exemplary embodiment together with the characteristics of the third exemplary embodiment. The descriptions of each component of the processor can be derived from the first and second exemplary embodiments, and thus will not be repeated.

The highly energy-efficient processor embodied as described above according to the present invention minimizes performance decrease occurring when a power supply voltage decreases, thereby maximizing energy efficiency defined as "performance/total power".

In addition, the present invention can maximize energy efficiency with a simple structure, support a parallel processing structure using a plurality of processors, and provide a parallel processor including a plurality of processing elements performing parallel processing.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A processor comprising:
a function unit block (FUB) for performing an operation according to instructions input from outside, the FUB comprising a plurality of functional units (FUs), each FU is configured to be individually activated or inactivated in response to when receiving:
- a corresponding individual FU enable (FUxEN) signal in which x corresponds to an integer between 1 to M where M is the number of FUs in the FUB, and
- a corresponding individual FU power output (FPxOUT) signal,
  - such that when the corresponding individual FUxEN signal is in an enabled state then the corresponding individual FPxOUT signal is at a normal supply voltage (Vdd) level which enables the corresponding FU into an active operational mode,
  - and such that when the corresponding individual FUxEN signal is in a disable state then the corresponding individual FPxOUT signal is at a reduced supply voltage (Vddl) level which disables the corresponding FU into a sleep operational mode;

at least one peripheral unit block (PUB) for performing data communication with an external device, each PUB comprising a plurality of peripheral units (PUs), each PU is configured to be individually activated or inactivated in response to when receiving:
- a corresponding individual PU enable (PyEN) signal in which y corresponds to an integer between 1 to L where L is the number of PUs in the PUB, and
- a corresponding individual PU power output (PxPOUT) signal,
  - such that when the corresponding individual PyEN signal is in an enabled state then the corresponding individual PyPOUT signal is at the Vdd level which enables the corresponding PU into an active operational mode,
  - and such that when the corresponding individual PyEN signal is in a disable state then the corresponding individual PyPOUT signal is at the Vddl level which disables the corresponding PU into a sleep operational mode;

an instruction decoder for interpreting the input instructions and determining the active and sleep operation modes of the FUB and the PUB required for executing the interpreted instructions;

a function unit block driver (FUBD) for applying the FPxOUT signal according to either the active and sleep operation mode of the FU to a function unit driver (FUD) of the FUB; and a peripheral unit block driver (PUBD) for applying the PyPOUT signal according to either the active and sleep operation mode of the PU to a peripheral unit driver (PUD) of the PUB.

2. The processor of claim 1, further comprising a plurality of FUBs.

3. The processor of claim 2, wherein each FU is individually powered by a corresponding dynamic voltage scaling power supply (DVSPS) that receives the FUxEN signal that corresponds to the FU and provides the FPxOUT signal to the corresponding FU.

4. The processor of claim 1, wherein further comprising a plurality of PUBS.

5. The processor of claim 4, wherein each PU is individually powered by a corresponding dynamic voltage scaling power supply (DVSPS) that receives the PyEN signal that corresponds to the PU and provides the FPxOUT signal to the corresponding PU.

6. A parallel processor comprising:
at least two peripheral unit processors (PUP), each PUP including a processing element including an instruction interpreter for interpreting instructions input from outside; and
an element driver for supplying the processing element with a power supply voltage,
wherein a level of the power supply voltage output from the element driver is determined according to the interpretation result of the instruction interpreter with respect to the received instructions; and a function unit block (FUB) for performing an operation according to instructions input from outside, the FUB comprising a plurality of functional units (FUs), each FU is configured to be individually activated or inactivated in response to when receiving:
- a corresponding individual FU enable (FUxEN) signal in which x corresponds to an integer between 1 to M where M is the number of FUs in the FUB, and
- a corresponding individual FU power output (FPxOUT) signal,
  - such that when the corresponding individual FUxEN signal is in an enabled state then the corresponding individual FPxOUT signal is at a normal supply voltage (Vdd) level which enables the corresponding FU into an active operational mode,
  - and such that when the corresponding individual FUxEN signal is in a disable state then the corresponding individual FPxOUT signal is at a reduced supply voltage (Vddl) level which disables the corresponding FU into a sleep operational mode.

7. The parallel processor of claim 6, further comprising a plurality of FUBs.

8. The parallel processor of claim 6, each FU is individually powered by a corresponding dynamic voltage scaling power supply (DVSPS) that receives the FUxEN signal that corresponds to the FU and provides the FPxOUT signal to the corresponding FU.

9. A parallel processor comprising:
at least two peripheral unit processors (PUPs), each PUP including:
- a processing element performing an operation or data transfer according to instructions input from outside, and
- an element driver supplying the processing element with a power supply voltage;

a processing element selector interpreting the instructions and determining a corresponding PUP required for processing the instructions, wherein the element driver supplies a different power supply voltage according to the determination of the processing element selector; and a function unit block (FUB) for performing an operation according to instructions input from outside, the FUB comprising a plurality of functional units (FUs), each FU is configured to be individually activated or inactivated in response to when receiving:
- a corresponding individual FU enable (FUxEN) signal in which x corresponds to an integer between 1 to M where M is the number of FUs in the FUB, and
- a corresponding individual FU power output (FPxOUT) signal,
  - such that when the corresponding individual FUxEN signal is in an enabled state then the corresponding individual FPxOUT signal is at a normal supply voltage (Vdd) level which enables the corresponding FU into an active operational mode,
  - and such that when the corresponding individual FUxEN signal is in a disable state then the corresponding individual FPxOUT signal is at a reduced supply voltage (Vddl) level which disables the corresponding FU into a sleep operational mode.

10. The parallel processor of claim 9, wherein the each FU is individually powered by a corresponding dynamic voltage scaling power supply (DVSPS) that receives the FUxEN signal that corresponds to the FU and provides the FPxOUT signal to the corresponding FU.

* * * * *